Feb. 7, 1933.  P. P. LEVENTIS  1,896,963
BRAKE FOR MOTOR VEHICLES
Filed Jan. 15, 1932   3 Sheets-Sheet 1
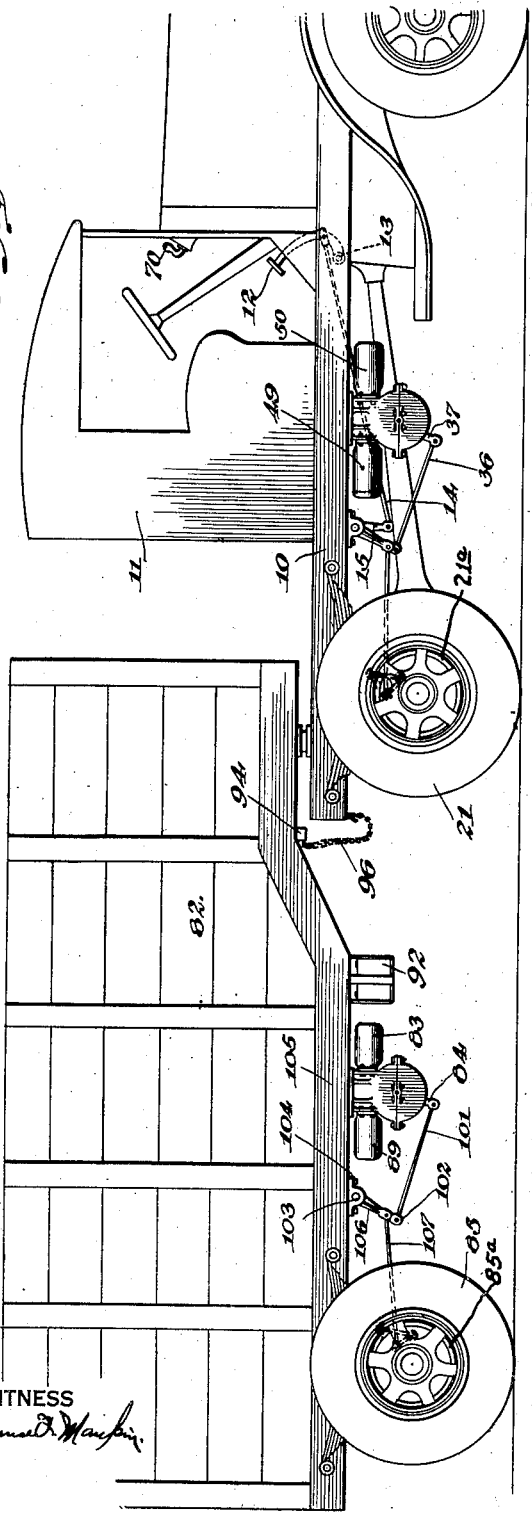
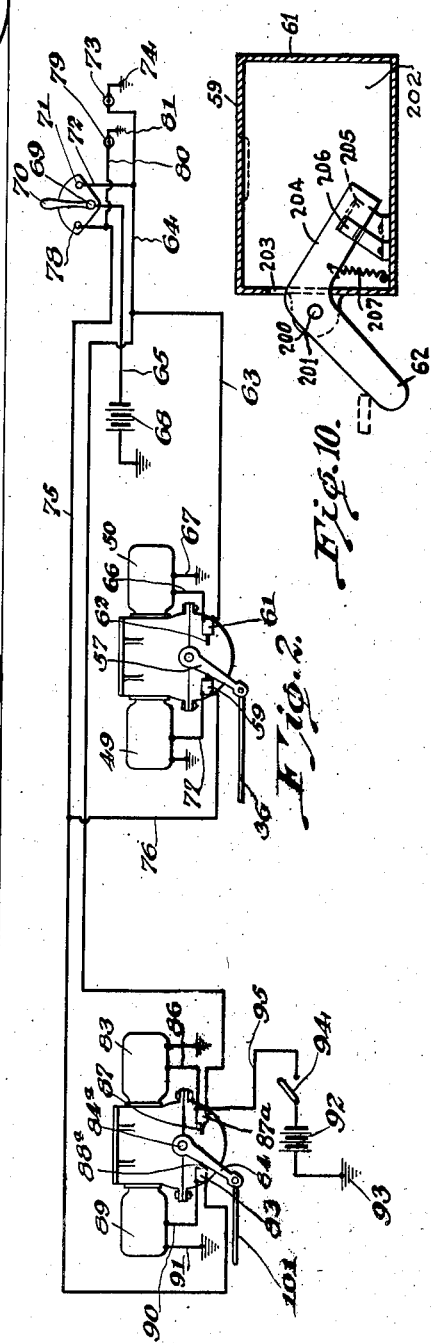
INVENTOR
*P. P. Leventis,*
BY
ATTORNEY

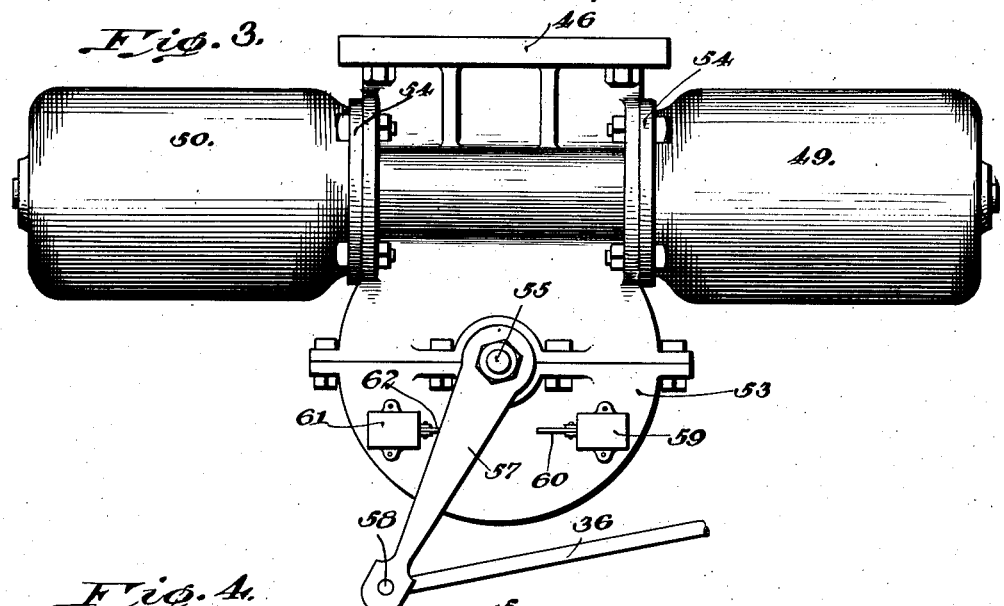
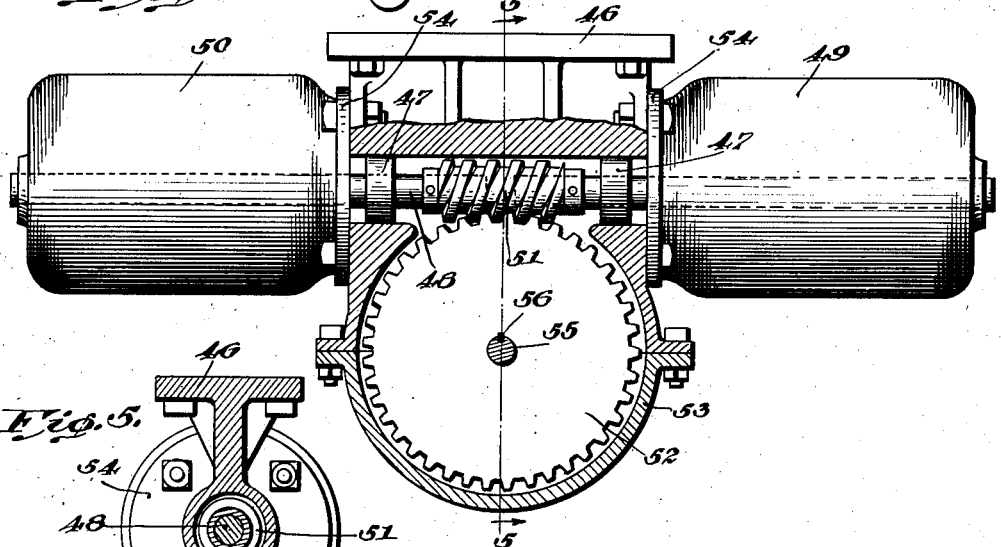
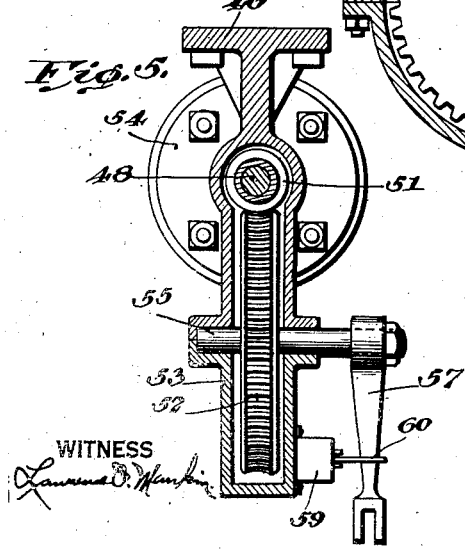

Feb. 7, 1933.  P. P. LEVENTIS  1,896,963
BRAKE FOR MOTOR VEHICLES
Filed Jan. 15, 1932   3 Sheets-Sheet 3
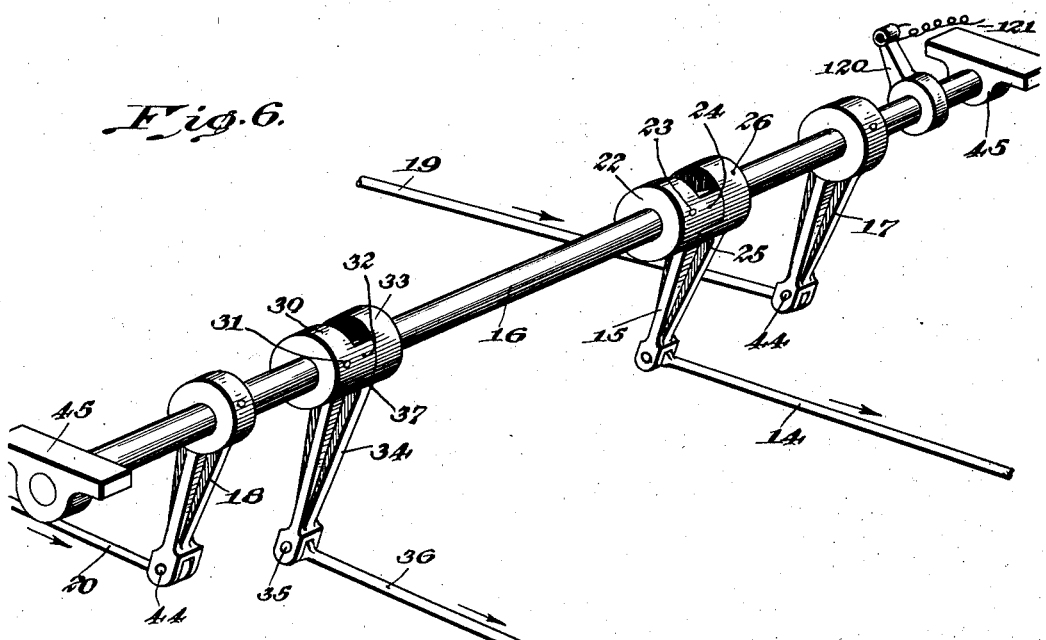
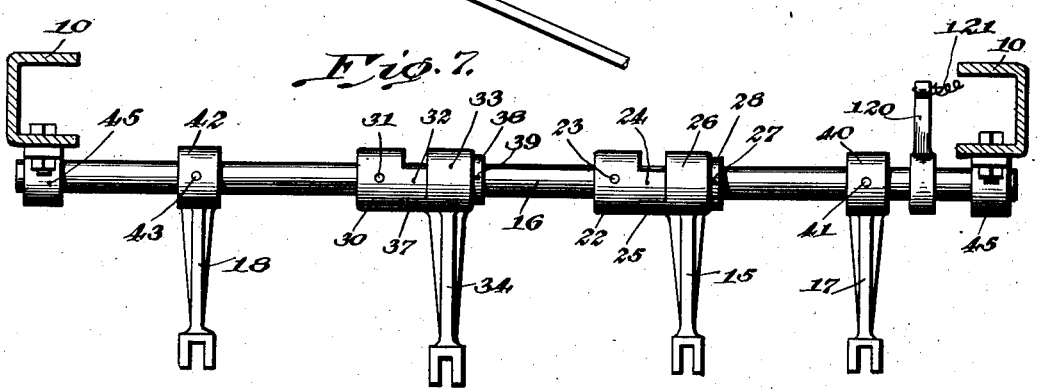
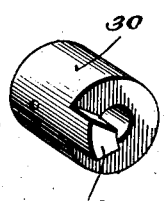
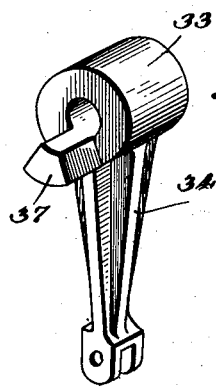
WITNESS
INVENTOR
P. P. Leventis,
BY
ATTORNEY Patented Feb. 7, 1933

1,896,963

UNITED STATES PATENT OFFICE

PETER P. LEVENTIS, OF GASTONIA, NORTH CAROLINA

BRAKE FOR MOTOR VEHICLES

Application filed January 15, 1932. Serial No. 586,894.

This invention relates to brakes for motor vehicles.

An object of the invention is the provision of a braking system for motor vehicles in which the brakes are controlled to an on and off position by means of motors in circuits which are controlled by switches located on the dash, the arrangement being such that the service brake pedal may be operated independently of the motor controlled device for applying the brake.

A further object of the invention is the provision of a braking system for trucks and trailers in which the brakes are normally operated by a switch controlling the circuits to a pair of motors, current being supplied for operating the motors through a storage battery.

A still further object of the invention is the provision of a system of operating brakes on trucks and connected trailers in which the brake on the trailer is automatically actuated if the trailer becomes disengaged from the front truck or moves too great a distance relative to the truck.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawings:

Figure 1 is a longitudinal side view of a truck and trailer showing my invention applied thereto, Figure 2 shows more or less diagrammatically the circuits for controlling the motor operated brakes, Figure 3 is a side view in elevation showing the reverse side of the device as disclosed in Figure 1, Figure 4 is a similar view partly in section, Figure 5 is a transverse vertical section taken along the line 5—5 of Figure 4, Figure 6 is a view in perspective of a countershaft interposed between the brakes and the operating mechanism for the brakes, Figure 7 is a transverse view in elevation partly in section of the countershaft and lever arm shown in Figure 6, Figure 8 is a view in perspective of a sleeve which is secured to the countershaft, and Figure 9 is a view in perspective of a lever arm loosely mounted on the countershaft.

Figure 10 is a vertical section of the switching mechanism.

Referring more particularly to the drawings, 10 designates generally the frame of the chassis of a truck 11. A service brake pedal 12 is pivoted at 13 on the chasis frame and is connected by means of a rod 14 with a lever arm 15 which is loosely mounted on a countershaft 16.

A pair of lever arms 17 and 18 are secured to the countershaft 16 and depend therefrom. Rods 19 and 20 extend respectively from the lever arms 17 and 18 and are connected with the operating mechanism which applies or releases the brakes (21a) of the rear wheels 21.

A collar 22 is secured at 23 to the countershaft 16 and this collar is provided with a laterally projecting finger 24 which is adapted to be engaged by a finger 25 formed on a collar 26. This collar forms an integral part of the lever arm 15.

A pin 27 secures a collar 28 to the countershaft 16 with the collar in engagement with the collar 26 so that the lever arm 15 is free to rotate independently of the shaft 16. On the other hand the shaft may be rotated without actuating the lever arm 15. The collar 28, however, maintains the fingers 24 and 25 in operative relation.

A collar 30 is pinned at 31 to the shaft 16 and is provided with a finger 32 projecting laterally from the collar. A collar 33 is provided with an integrally formed depending lever arm 34 which is connected at 35 with a rod 36. The collar 33 is provided with a finger 37 which is adapted to engage the finger 32 for a purpose to be presently explained.

A collar 38 is secured to the countershaft 16 by a pin 39 with the collar in engagement with a collar 33, so that said shaft may be rocked independently of the lever arm 34. The collar 38 maintains the fingers 32 and 37 in operative relation.

The lever arm 17 is provided with a collar 40 which is pinned at 41 to the shaft 16, the said collar being received by the countershaft.

The lever arm 18 is also provided with a collar 42 received by the shaft 16 and is secured thereto by means of a pin 43. The collar 42 is formed integrally with the lever arm 18. The rods 19 and 20 are respectively pivotally connected, as shown at 44, with their respective lever arms 17 and 18.

The shaft 16 is mounted in bearings 45 which are secured to the frame of the chassis of the truck 11 as shown more particularly in Figs 1 and 7.

A bracket 46 is secured to the chassis frame 10, as shown more particularly in Figs. 1 and 4, which receives a shaft 48 directly coupled with a motor 49 and a motor 50.

A worm 51 is formed on the shaft 48 and meshes with a worm gear 52 mounted in a housing 53 which is carried from the end plates 54 of the motors 49 and 50.

A shaft 55 is keyed at 56 to the worm gear 52 and projects through the housing 53. A lever arm 57 is secured to the shaft 55 and has its lower end pivotally connected at 58 to the rod 36.

A switch 59 is mounted upon the inner face of the housing 53 and controls the circuit to the motor 49 which is termed the release motor. This switch has an arm 60 extending across the path of the moving lever arm 57 so that when the said lever arm engages the arm 60 it will actuate the switch to open position and thereby open the circuit to the motor 49. A second switch 61 is also mounted on the inner face of the housing 53 and is provided with an arm 62 extending across the path of the moving lever arm 57 so that the arm 62 will be actuated by the lever arm and thus open the switch and thereby cut off the current to the power motor 50.

Referring more particularly to Fig. 2 it will be seen that the switch 61 which is automatically controlled through the finger 62 and the lever arm 57 is in circuit with wires 63—64—65 and 66. A wire 67 grounds the motor. The wire 65 connects the battery 68 with one terminal 69 of a switch arm 70. The other terminal 71 is connected by means of a wire 72 with a wire 64. A pilot light 73 is in circuit with the wire 64 and a ground 74.

Wires 75, 76, and 77 connect one terminal 78 of the switch arm 70 with the motor 49. The wires 65 through the switch arm 70 completes the circuit of the motor 49 with the battery 68. A pilot light 79 is connected with the contact 78 by means of a wire 80 and a ground 81 completes the circuit to the battery 68, so that when the motor is operated the pilot light 79 will be illuminated.

An arrangement for controlling the brake bands 85ª of a trailer 82 is shown in Fig. 1 and this arrangement is similar in all respects to the motor controlled braking device which is applied to the truck 11. An electric motor 83, which is in circuit with the battery 68, is adapted to cause the lever arm 84 to apply the brake bands 85ª to the wheel 85 of the trailer. The wire 64 is not only connected with the motor 50 but with the motor 83 by means of an automatic switch 87ª and a wire 86. This switch is controlled through the arm 84 engaging a finger 87 of the switch element 85.

A switch 88 is controlled through an arm 88ª which is actuated by the moving lever or the arm 84. This switch controls the motor 89 which is likewise in circuit with the battery 68 when the switch arm 70 is moved into engagement with the contact arm 78. The wires 75, a wire 90 and a wire 91 completes the circuit to the motor 89 through the battery 68.

A second battery 92 is shown connected to the bottom of the trailer 82 and is grounded at 93. A switch 94 is adapted to close the circuit to the motor 83 through a wire 95 for applying the brake bands when the trailer 82 moves too great a distance relative to the truck 11 or when the trailer has become disengaged from the truck. This switch is shown at 94 on the forward end of the trailer 82 and the operating arm is connected with a chain 96. The other end of the chain is connected to the chassis 10 of the truck 11. By this construction if there is too great a movement between the truck 11 and the trailer 82, the switch arm 94 will be actuated for closing the circuit to the battery 92 and the motor 83 so that the brakes on the trailer will be applied and prevent movement of said trailer.

The arm 62 is pivoted at 200 on ears 201 projecting from a switch generally designated by the numeral 61. This switch includes a casing 202 having an opening 203 through which projects an arm 204, which is integrally formed with the arm 62. The arm 204 acts as a knife switch engaged between a pair of spaced contacts 205 and 206 which are connected respectively with the wires 63 and 66, so that when the arm 204 is engaged by the contacts 205 and 206 the circuit will be closed. A spring 207 maintains the arm 204 normally in engagement with the contacts 205 and 206.

The operation of my device is as follows: When it is desired to stop the truck 11 and the trailer 82 it is only necessary for the operator of the truck to move the switch lever 70 into engagement with the contact 71 whereby the circuit between the battery 68 and the motor 50 and the circuit between the battery 92 and the motor 83 will be closed, thereby causing the motors to actuate their respective shafts 55 and 84ª so that said shafts will move the lever arms 57 and 84 towards the front of the vehicle and thus apply the brakes. When the lever arm 57 engages the switch arm 62, the switch to the motor 50 will be open and thus prevent further operation of the motor. In the same manner lever arm 84 will actuate switch element 87 and open the circuit to motor 83. In this position the brakes will be applied and the vehicle will be maintained against further movement.

Due to the fact that all of the brakes must be released through the gear 52 and a similar gear operating shaft 84ª, and since these gears mesh with their respective worms, said gears will be locked against rotation since the gears cannot operate the worm.

If it be desired to release the brakes, it will be necessary for the operator of the truck to shift the lever 70 from the contact 71 to the contact 78, thereby placing the motors 49 and 89 in circuit with their respective batterys 68 and 92 causing rotation of the worms and the gears so that the motors 49 and 89 will reversely rotate the respective shafts 55 and 84ª, thereby releasing the brakes so that the vehicle may be continued under its own power.

It will be noted by this construction that when the brakes have been applied through the motors 50 and 83 they cannot be released until the motors 49 and 89 are actuated due to the fact that the worm gears operated by means of the worms cannot on the other hand actuate the worms.

A rod 101 connects the lever arm 84 with a lever arm 102 which is loosely mounted on a countershaft 103 carried by brackets 104 secured to the chassis frame 105 of the trailer 82. A lever arm 106 is rigidly connected with a shaft 103 and operates a rod 107 which in turn actuates the brake bands 85ª of the wheel 85.

A detail construction of the countershaft 103 is deemed unnecessary since this construction is identical with that disclosed in connection with the truck 11 and illustrated in Figs. 6 to 9, inclusive.

While the brake bands have releasing springs, an arm 120 secured to the shaft 16 tends to reversely rotate the shaft 16 by the pull of a spring 121 which is connected between the free end of the arm and the chassis of the truck. The lever arm 34 and the rod 36 are prevented from being operated by the lever arm 120 and spring 121 by the meshing of the worm gear 52 and worm 51. The shaft tends to rotate the lever arm 34 through the interengaging fingers 32 and 37. When, however, the motor 49 is energized it will cause rotation of the worm 51 and worm gear 52 in a reverse manner so that the spring 121 may rotate the shaft 16 and rock lever arm 34.

I claim:

1. A braking apparatus for vehicles comprising a rockable countershaft, a plurality of lever arms secured to said shaft, brake bands, means connecting the free ends of the lever arms with the brake bands, a pair of electric motors, a shaft having a worm and directly coupled to the motors, one of the motors adapted to drive the shaft in one direction, the other adapted to drive the shaft in the opposite direction, a second shaft, a worm gear in mesh with the worm and secured to the second shaft, a lever arm secured to the second shaft, means connecting said last mentioned lever arm with the countershaft so that said shaft may be rocked in one direction when one of the motors is operated, electric circuit for each motor, a double-acting switch for opening and closing either circuit, and means for returning the countershaft to a normal inoperative position.

2. A braking apparatus for vehicles comprising a rockable countershaft, brake bands, means operatively connecting said shaft with the brake bands, a pair of electric motors, an electric circuit for each motor, a switching device for opening and closing either circuit, a worm adapted to be driven by one of the motors in one direction and adapted to be driven in the opposite direction by the other motor, a worm gear driven in opposite directions by the worm, means connecting the worm gear with the shaft for rocking the shaft in one direction, and means for rocking the shaft in the opposite direction.

3. A braking apparatus for vehicles comprising a rockable countershaft, brake bands, means operatively connecting said shaft with the brake bands, a pair of electric circuits, a motor in each circuit, one motor being rotated in an opposite direction from the direction of rotation of the other motor, a worm rotated by the motors, a worm gear rotated by the worm, a lever arm rocked by the worm gear, a switch at each side of the lever arm and adapted to be actuated by said arm for opening the circuit to one of the motors, a manually operated switch for closing each circuit to a motor.

4. A braking apparatus for vehicles comprising a rockable countershaft, brake bands, means operatively connecting said shaft with the brake bands, a pair of electric circuits, a motor in each circuit, one motor being rotated in on opposite direction from the direction of rotation of the other motor, a worm rotated by the motors, a worm gear rotated by the worm, a lever arm rocked by the worm gear, a switch at each side of the lever arm and adapted to be actuated by said arm for opening the circuit to one of the motors, a manually operated switch for closing each circuit to a motor, and means for closing the first-mentioned switches when the lever arm is moved away therefrom.

5. A braking apparatus for vehicles comprising a rockable countershaft, brake bands, means operatively connecting said shaft with the brake bands, a pair of electric circuits, a motor in each circuit, one motor being rotated in an opposite direction from the direction of rotation of the other motor, a worm rotated by the motors, a worm gear rotated by the worm, a lever arm rocked by the worm gear, a switch at each side of the lever arm and adapted to be actuated by said arm for opening the circuit to one of the motors, a manually operated switch for closing each circuit to a motor, means for closing the first-mentioned switches when the lever arm is moved away therefrom, and means for returning the countershaft to a normal inoperative position when one of the motors has moved the lever arm to an inoperative position.

6. An interconnected braking apparatus for a power-operated vehicle and a drawn vehicle and including brake bands comprising a pair of electric motors on each vehicle, a motor on one vehicle being in electric circuit with a motor on the other vehicle, a double-acting switch for opening or closing said circuits, a lever arm caused to be rocked in one direction by a motor of each circuit and operatively connected with a brake band for causing operation of said band, means for releasing the brake bands when the other motors are energized, and switches actuated by the lever arm for opening the circuits to stop the motors.

7. An interconnected braking apparatus for a power-operated vehicle and a drawn vehicle and including brake bands comprising a pair of electric motors on each vehicle, a motor on one vehicle being in electric circuit with a motor on the other vehicle, a double-acting switch for opening or closing said circuits, a lever arm caused to be rocked in one direction by a motor of each circuit and operatively connected with a brake band for causing operation of said band, means for releasing the brake bands when the other motors are energized, switches actuated by the lever arm for opening the circuits to stop the motors, and an auxiliary switch in the circuit to one of the motors on the drawn vehicle, means connecting the switch with the other vehicle so that when the vehicles move a distance apart which is greater than the length of the connecting means between the switch and the other vehicle, the switch will be actuated to closed position and energize one of the motors on the drawn vehicle to cause application of the brakes on said vehicle.

8. An interconnected braking apparatus for a power-operated vehicle and a drawn vehicle and including brake bands comprising a pair of electric motors on each vehicle, a motor on one vehicle being in electric circuit with a motor on the other vehicle, a double-acting switch for opening or closing said circuits, a lever arm caused to be rocked in one direction by the motor of each circuit and operatively connected with a brake band for causing operation of said band, means for releasing the brake bands when the other motors are energized, switches actuated by the lever arm for opening the circuits to stop the motors, an auxiliary switch incorporated in the circuit of one of the motors on the drawn vehicle, and means connected between said switch and the power-operated vehicle for causing closing of the circuit to said motor and the application of the brakes to the drawn vehicle when one of the vehicles moves too great a distance from the other vehicle.

PETER P. LEVENTIS.